(12) United States Patent
Liu (10) Patent No.: US 11,644,142 B2
(45) Date of Patent: May 9, 2023

(54) BROKEN PIPE EXTRACTOR (71) Applicant: TRIPLE WIN TECHNOLOGY(SHENZHEN) CO. LTD., Shenzhen (CN)

(72) Inventor: Song-Hao Liu, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 137 days.

(21) Appl. No.: 17/183,928

(22) Filed: Feb. 24, 2021

(65) Prior Publication Data
US 2022/0205576 A1 Jun. 30, 2022

(30) Foreign Application Priority Data

Dec. 31, 2020 (CN) .......................... 202011616190.1

(51) Int. Cl.
F16L 55/18 (2006.01)
F16L 55/16 (2006.01)
B23P 19/02 (2006.01)
B25B 27/00 (2006.01)

(52) U.S. Cl.
CPC ........... F16L 55/18 (2013.01); F16L 55/1608 (2013.01); B23P 19/025 (2013.01); B25B 27/00 (2013.01)

(58) Field of Classification Search
CPC ........................ B23B 31/4093; B23P 19/025
USPC ....................................................... 294/86.32
See application file for complete search history.

(56) References Cited

U.S. PATENT DOCUMENTS

| 848,252 | A | * | 3/1907 | Kitterman | ................ B21J 15/50 29/257 |
| 1,348,832 | A | * | 8/1920 | Magnan | .................... B25B 7/04 81/437 |
| 1,377,469 | A | * | 5/1921 | Erickson | ............... B25B 27/023 29/256 |
| 1,412,180 | A | * | 4/1922 | Holmes | ................. B25B 27/023 29/256 |
| 1,512,422 | A | * | 10/1924 | Hatcher | ................... B21J 13/08 29/251 |
| 1,782,303 | A | * | 11/1930 | Imlach | .................. B25B 27/023 29/264 |
| 2,549,429 | A | * | 4/1951 | Cowles | ................. B25B 27/062 29/257 |
| 2,671,263 | A | * | 3/1954 | Hamilton | .............. B25B 27/062 29/282 |
| 2,889,617 | A | * | 6/1959 | Mitcham | ............... B25B 27/062 29/283 |
| 3,731,364 | A | * | 5/1973 | Romero | .................. B25B 27/18 29/261 |

(Continued)

Primary Examiner — Robert K Arundale
Assistant Examiner — Richard K. Durden
(74) Attorney, Agent, or Firm — ScienBiziP, P.C.

(57) ABSTRACT

A broken pipe extractor for removing a broken pipe from a pipe joint includes a hollow pipe body, a first blocking block, a second blocking block, and a hook needle assembly. The first blocking block is located in the pipe body for fixing one end of the pipe joint. The first blocking block defines a through hole. A diameter of the through hole is greater than or equal to an inner diameter of the pipe joint. The second blocking block is movably fixed to one end of the pipe body for fixing another end of the pipe joint. The hook needle assembly is configured to be inserted through the through hole of the first blocking block and extend to the broken pipe to remove the broken pipe.

20 Claims, 7 Drawing Sheets (56) References Cited

U.S. PATENT DOCUMENTS

| | | | | |
|---|---|---|---|---|
| 3,823,462 A * | 7/1974 | Kanda | ............ | B25B 27/02 |
| | | | | 29/268 |
| 3,862,483 A * | 1/1975 | Kloster | ............ | B25B 27/023 |
| | | | | 29/257 |
| 4,349,952 A * | 9/1982 | Decker | ............ | E21B 19/12 |
| | | | | 29/402.06 |
| 4,377,956 A * | 3/1983 | Cooper | ............ | B25B 27/18 |
| | | | | 294/95 |
| 4,694,569 A * | 9/1987 | Colvell | ............ | B25B 27/023 |
| | | | | 29/260 |
| 5,519,929 A * | 5/1996 | Bleckman | ............ | B25B 27/023 |
| | | | | 29/264 |
| 6,745,447 B2 * | 6/2004 | Smith | ............ | B25B 27/06 |
| | | | | 29/259 |
| 9,120,215 B2 * | 9/2015 | Muenchrath | ............ | B25B 27/28 |
| 2006/0242810 A1 * | 11/2006 | Wridt | ............ | B25B 27/062 |
| | | | | 29/257 |
| 2012/0151727 A1 * | 6/2012 | Dewell | ............ | B25B 27/10 |
| | | | | 29/257 |

\* cited by examiner

BROKEN PIPE EXTRACTOR

FIELD

The subject matter herein generally relates to pipelines, and more particularly to a broken pipe extractor.

BACKGROUND

Tubular structures such as pipelines are often used in industrial production for transporting water, oil, gas, etc. Pipe joints are used to connect multiple pipes together to meet long-distance transportation requirements or connect pipes of different diameters together. However, due to aging of the tubular structure, the tubular structure may break inside the pipe joint, and the broken pipe is difficult to take out, resulting in the pipe joint being scrapped.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Figure 1:
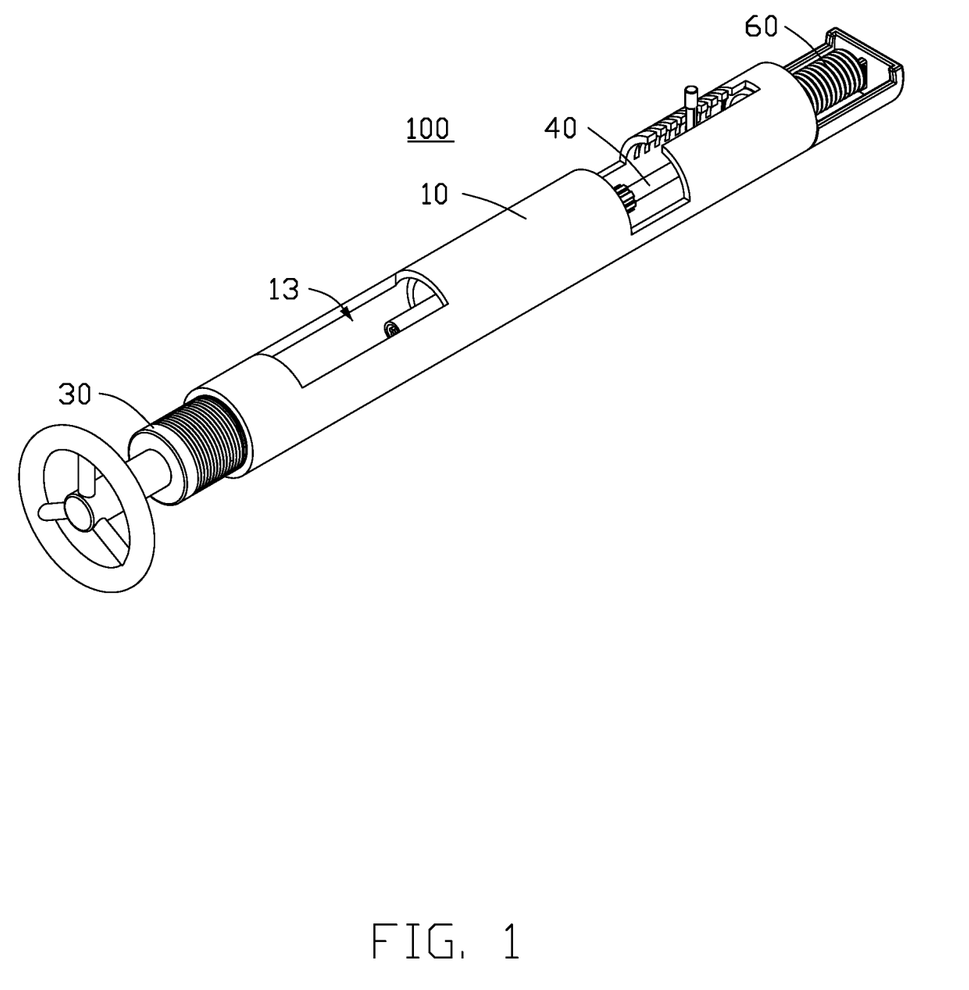
FIG. 1 is a schematic perspective diagram of a broken pipe extractor according to an embodiment of the present application.
Figure 2:
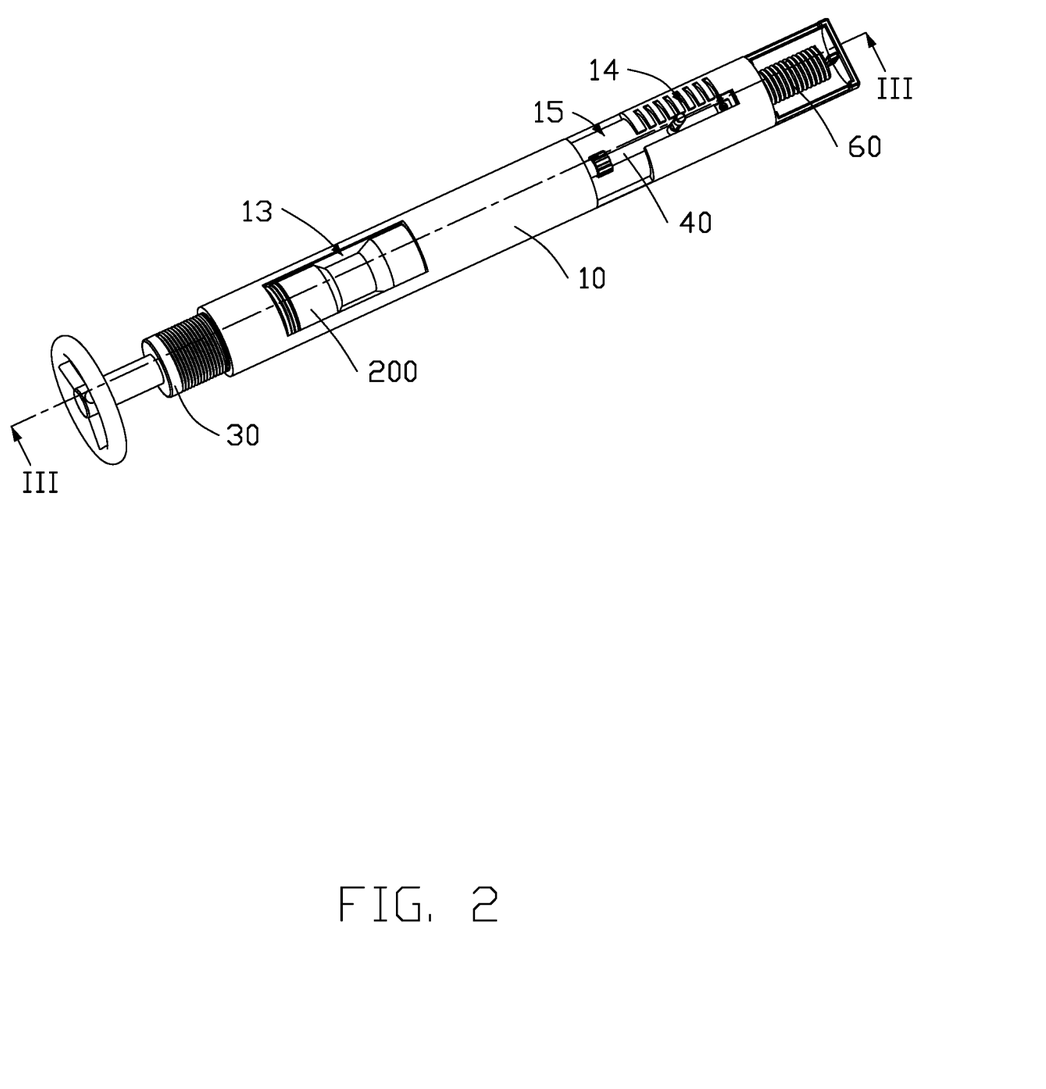
FIG. 2 is a schematic perspective diagram of the broken pipe extractor containing a pipe joint.

FIG. 1 and FIG. 2 show an embodiment of a broken pipe extractor 100 for extracting a broken pipe 210 in a pipe joint 200. The broken pipe 210 is located in the pipe joint 200 and clamped on an inner wall of the pipe joint 200.

Figure 3:
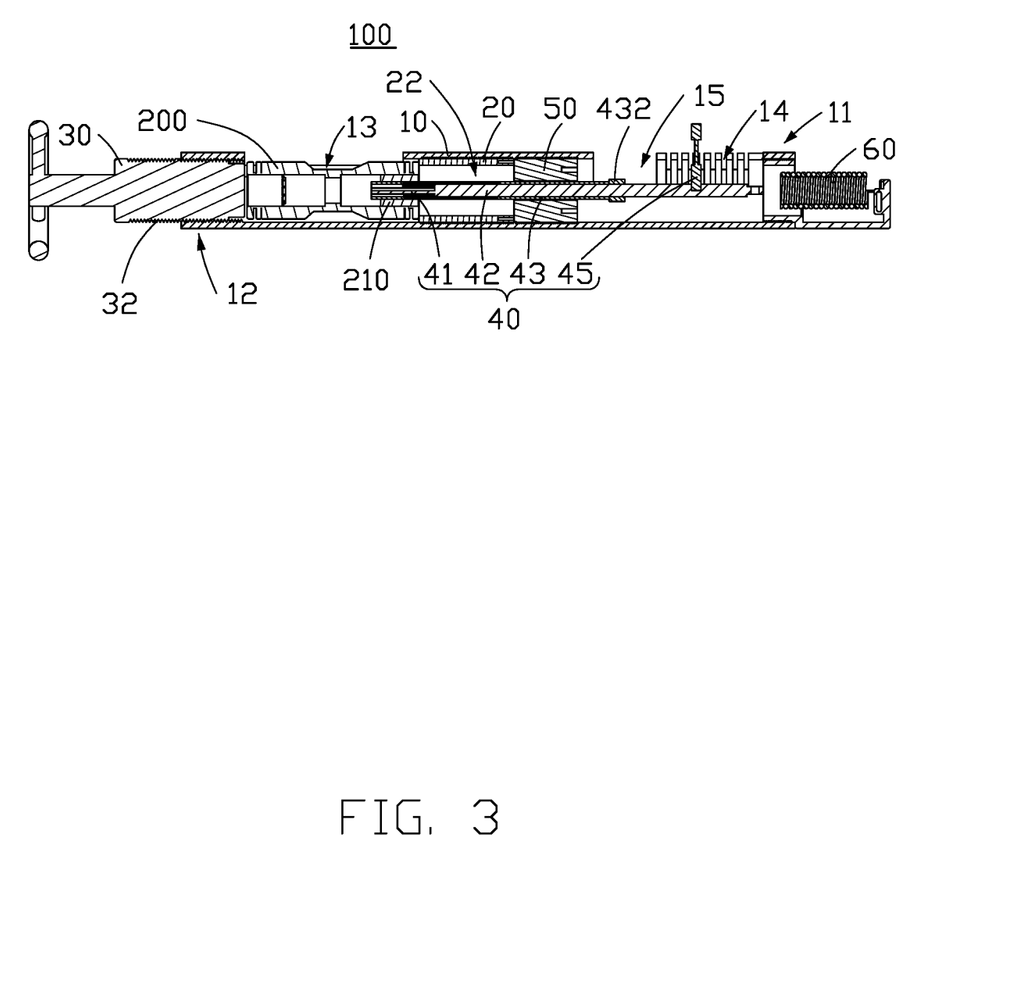
FIG. 3 is a cross-sectional view taken along line of FIG. 2.

Referring to FIG. 3, the broken pipe extractor 100 includes a pipe body 10, a first blocking block 20, a second blocking block 30, and a hook needle assembly 40. The pipe body 10 is substantially hollow. The pipe joint 200 having the broken pipe 210 is placed in the pipe body 10. The first blocking block 20 and the second blocking block 30 respectively abut against two ends of the pipe joint 200. The hook needle assembly 40 is inserted through the first blocking block 20 and extends to the broken pipe 210 in the pipe joint 200, hooks the broken pipe 210, and then takes out the broken pipe 210.

The pipe body 10 is substantially cylindrical, and inside the pipe body 10 defines a cylindrical cavity (not labeled). The pipe body 10 includes a first end 11 and a second end 12. Each of the first end 11 and the second end 12 is an open end, and the pipe joint 200 can be placed in the cylindrical cavity through either the first end 11 or the second end 12 of the pipe body 10.

The first blocking block 20 can be placed in the cylindrical cavity of the pipe body 10 through the first end 11, and the second blocking block 30 can be placed in the cylindrical cavity of the pipe body 10 through the second end 12.

A shape of the first blocking block 20 matches a shape of an inner wall of the pipe body 10. In one embodiment, an outer diameter of the first blocking block 20 is substantially equal to an inner diameter of the pipe body 10, and the first blocking block 20 is fixed or slidably arranged in the cylindrical cavity of the pipe body 10. In one embodiment, the first blocking block 20 is fixed to the inner wall of the pipe body 10.

The first blocking block 20 defines a through hole 22 along a length direction L1 of the pipe body 10. The hook needle assembly 40 is movably inserted through the through hole 22 of the first blocking block 20 and extends to the broken pipe 210 in the pipe joint 200, hooks the broken pipe 210 in the pipe joint 200, and applies a force toward the first end 11 to take out the broken pipe 210.

Further, a diameter of the through hole 22 is greater than or equal to an inner diameter of the pipe joint 200. In one embodiment, the diameter of the through hole 22 is greater than an outer diameter of the broken pipe 210, so that the hook needle assembly 40 extending along the length direction L1 of the has a certain space for hooking and removing the broken pipe 210 from the pipe joint 200, and the first blocking block 20 is prevented from blocking the broken pipe 210 during a process of hooking and removing the broken pipe 210.

In one embodiment, an inner wall of the pipe body 10 at the second end 12 and an outer wall of the second blocking block 30 are provided with matching threads 32, so that a length of the second blocking block 30 inserted into the pipe body 10 can be adjusted by the threads 32. A distance between the second blocking block 30 and the first blocking block 20 can be adjusted according to a length of the pipe joint 200 received in the cylindrical cavity, so that the second blocking block 30 and the first blocking block 20 respectively abut against two sides of the pipe joint 200 to fix the pipe joint 200 in the pipe body 10.

In one embodiment, the pipe joint 200 may be placed in the cylindrical cavity through the opening of the second end 12.

In one embodiment, a side surface of the pipe body 10 defines a first opening 13 located between the second end 12 and the first blocking block 20, and the pipe joint 200 can be placed in the cylindrical cavity through the first opening 13.

Figure 4:
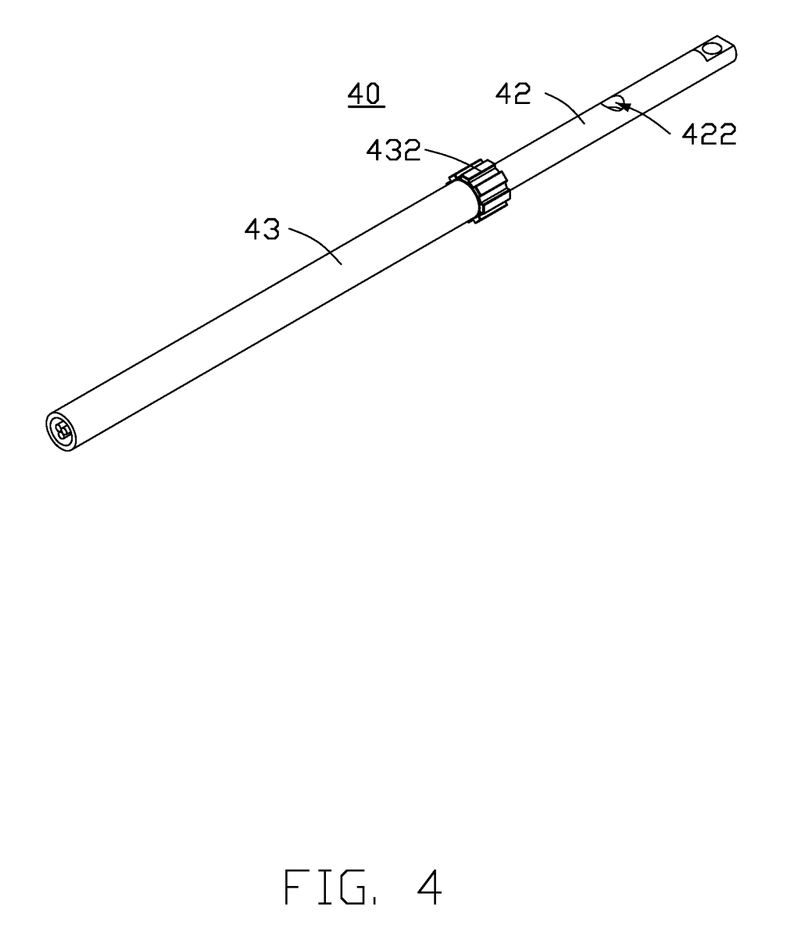
FIG. 4 is a schematic perspective diagram of a hook needle assembly sleeved in a needle sleeve.
Figure 5:
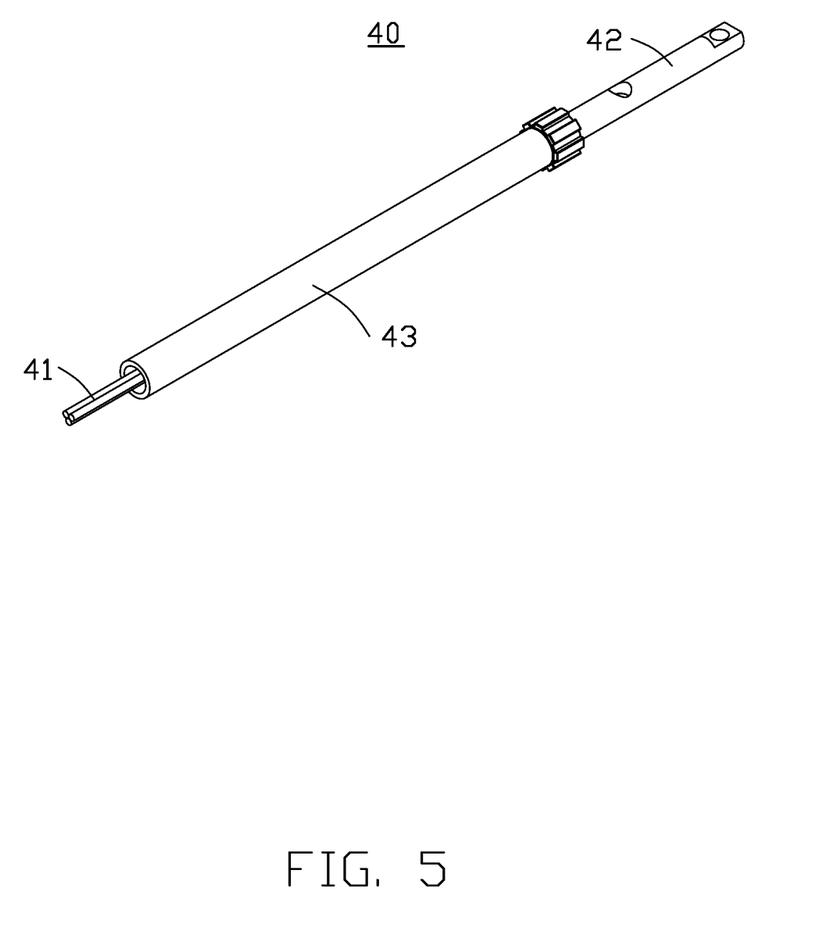
FIG. 5 is a schematic perspective diagram of the hook needle assembly showing a needle head protruding from the needle sleeve.
Figure 6:
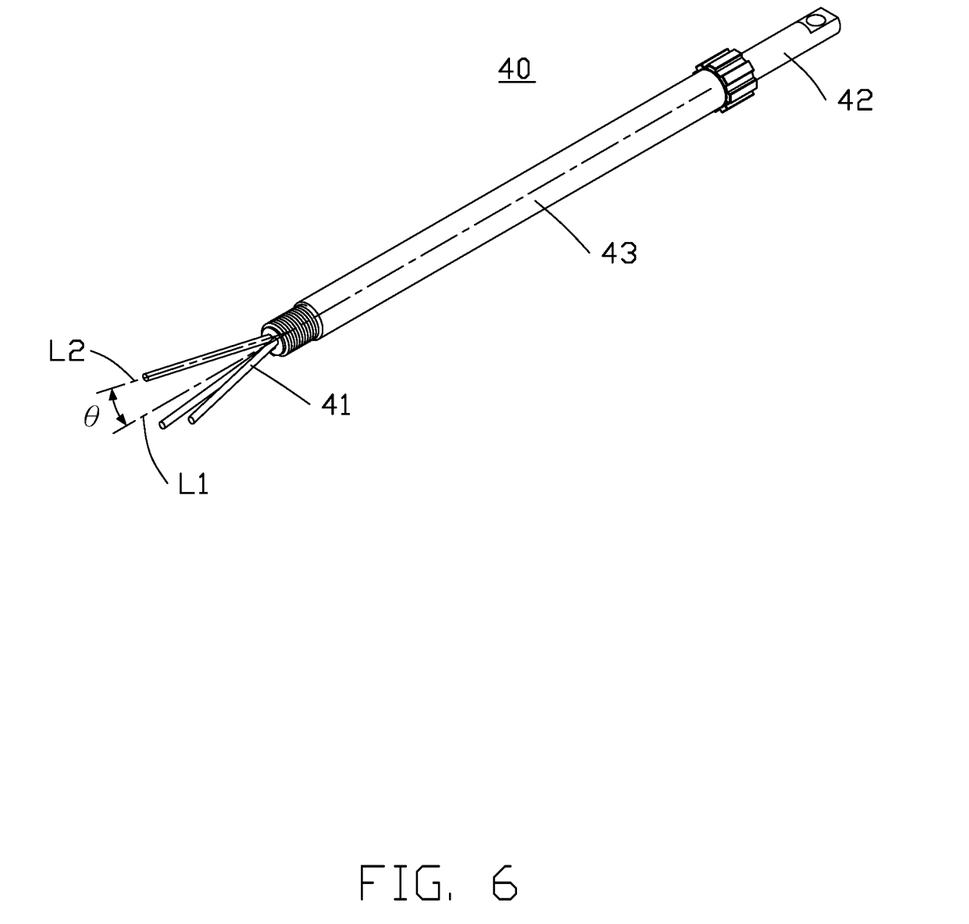
FIG. 6 is a schematic perspective diagram of the hook needle assembly showing the needle head spread out.

Referring to FIGS. 4, 5, and 6, the hook needle assembly 40 includes a needle head 41 and a needle rod 42. The needle head 41 is coupled to the needle rod 42. The needle head 41 and the needle rod 42 extend in a same direction. The needle rod 42 is inserted into the first blocking block 20, and the needle head 41 protrudes from the first blocking block 20.

The needle head 41 has a certain elasticity. When the needle head 41 is located in the first blocking block 20, the needle head 41 extends along the same direction as the needle rod 42. Referring to FIG. 6, when the needle head 41 protrudes from the first blocking block 20, the needle head 41 spreads out, so that the needle head 41 can hook the broken pipe 210 from multiple directions. An extension direction L2 of the needle head 41 and the length direction L1 form an included angle θ, where 0°<θ<90°.

Figure 7:
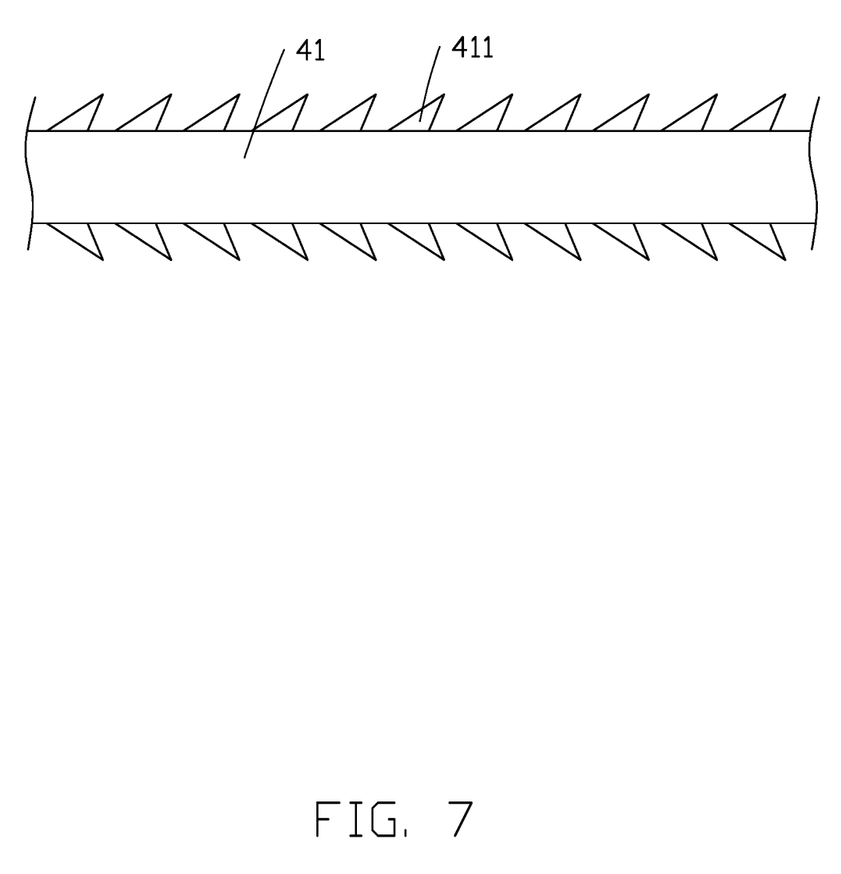
FIG. 7 is an enlarged view of a portion of a needle head shown in FIG. 5.

A number of the needle head 41 may be one or more than one, and each needle head 41 is provided with one or more barbs 411 (FIG. 7) extending toward the needle rod 42 to facilitate hooking the broken pipe 210 and applying a force toward the first end 11, so that the broken pipe 210 can be removed.

The hook needle assembly 40 further includes a needle sleeve 43 sleeved on the needle rod 42 and the needle head 41, so that when the needle head 41 passes through the first blocking block 20, the needle head 41 is restrained by the needle sleeve 43 to prevent the needle head 41 from spreading out and facilitate the needle head 41 passing through the first blocking block 20.

Referring to FIG. 3, the needle sleeve 43 may further include a protrusion 432 located at one end of the needle sleeve 43. The broken pipe extractor 100 further includes a third blocking block 50. The third blocking block 50 is movably arranged in the pipe body 10 and located on a side of the first blocking block 20 away from the second blocking block 30. The third blocking block 50 can abut against the first blocking block 20. The third blocking block 50 is substantially hollow, and the needle sleeve 43 is inserted through the third blocking block 50 and extends to the first blocking block 20. An outer diameter of the protrusion 432 is greater than an inner diameter of the third blocking block 50, so as to limit a position of the needle sleeve 43 so that the needle sleeve 43 does not prevent the needle head 41 from expanding to hook the broken pipe 210.

In one embodiment, the pipe body 10 defines a plurality of scale grooves 14 adjacent to the first end 11. A length of the needle head 41 inserted in the pipe joint 200 can be determined according to the plurality of scale grooves 14.

Further, the needle rod 42 may define a receiving groove 422. The receiving groove 422 may be a groove or a through hole. A number of the receiving groove 422 may be one or more than one, and opening directions of the more than one receiving grooves 422 may be the same or different. The hook needle assembly 40 further includes a handle 45. One end of the handle 45 is received in the receiving groove 422, and the handle 45 facilitates moving the hook needle assembly 40 along the length direction L1. The handle 45 can facilitate protruding the needle head 41 from the needle sleeve 43 or sleeving the needle head 41 in the needle sleeve 43. The handle 45 can also be latched in a corresponding one or more of the scale grooves 14.

The pipe body 10 further defines a second opening 15. The second opening 15 is located between the first opening 13 and the scale grooves 14. The second opening 15 can be used for rotating the needle cover 43 to facilitate moving the hook needle assembly 40 along the length direction L1.

The broken pipe extractor 100 further includes a pulling member 60 coupled to an end of the needle rod 42 away from the needle head 41. The pulling member 60 can facilitate pulling out the hook needle assembly 40, so that the broken pipe 210 hooked by the needle head 41 is removed. The pulling member 60 may be a resilient member such as a tension spring or a spring, or may be a rigid member such as a hook.

Understandably, the broken pipe extractor 100 provided in the present application can be used to extract the broken pipe 210 from the pipe joint 200 having a smaller inner diameter than the pipe body 10.

In one embodiment, the broken pipe extractor 100 can be applied to pipe joints 200 of different outer diameters by switching the first blocking block 20 and the third blocking block 50 of different sizes. A position of the hook needle assembly 40 inserted through the first blocking block 20 and the third blocking block 50 can be adjusted so that the hook needle assembly 40 passes through a center along the length direction L1, which is beneficial for the needle head 41 of the hook needle assembly 40 to hook the broken pipe 210 with a uniform force from different directions.

In summary, the broken pipe extractor 100 can fix pipe joints 200 of different lengths in the pipe body 10 through the first blocking block 20 and the movable second blocking block 30, and then the hook needle assembly 40 inserted through the first blocking block 20 can hook the broken pipe 210 in the pipe joint 200 and remove the broken pipe 210 from the pipe joint 200. The operation is simple, and the pipe joint 200 can be reused. In addition, the broken pipe extractor 100 can be adapted to pipe joints 200 of different diameters and different lengths, so that an application range of the broken pipe extractor 100 is wide.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A broken pipe extractor for removing a broken pipe from a pipe joint, the broken pipe extractor comprising:
   a hollow pipe body;
   a first blocking block located in the pipe body for fixing one end of the pipe joint, the first blocking block defining a through hole;
   a second blocking block movably fixed to one end of the pipe body for fixing another end of the pipe joint; and
   a hook needle assembly configured to be inserted through the through hole of the first blocking block and extend to the broken pipe to remove the broken pipe.

2. The broken pipe extractor of claim 1, wherein:
   the hook needle assembly comprises a needle head and a needle rod coupled to the needle head;
   the needle rod is configured to be inserted through the first blocking block; and the needle head is configured to protrude from the first blocking block and hook the broken pipe.

3. The broken pipe extractor of claim 2, wherein:
the needle head is elastic;
when the needle head protrudes from the first blocking block, an extension direction of the needle head and a length direction of the pipe body form an included angle $\theta$; and $0° < \theta < 90°$.

4. The broken pipe extractor of claim 3, wherein:
the hook needle assembly further comprises a needle sleeve; and
the needle sleeve is sleeved on the needle rod and the needle head.

5. The broken pipe extractor of claim 4, further comprising a third blocking block, wherein:
the needle sleeve comprises a protrusion located at one end of the needle sleeve;
the first blocking block is located between the third blocking block and the second blocking block;
the needle sleeve is inserted into the third blocking block and extends to the first blocking block;
an outer diameter of the protrusion is larger than an inner diameter of the third blocking block; and
the third blocking block is configured to limit a position of the needle sleeve.

6. The broken pipe extractor of claim 1, wherein:
an outer wall of the second blocking block and an inner wall of the pipe body are provided with matching threads.

7. The broken pipe extractor of claim 1, wherein:
the pipe body defines a first opening located between the first blocking block and the second blocking block.

8. The broken pipe extractor of claim 7, wherein:
the pipe body further comprises at least one scale groove; and
the first blocking block is located between the at least one scale groove and the first opening.

9. The broken pipe extractor of claim 8, wherein:
the pipe body further defines a second opening; and
the second opening is located between the first blocking block and the at least one scale groove.

10. The broken pipe extractor of claim 1, further comprising a pulling member, wherein:
the pulling member is coupled to one end of the hook needle assembly.

11. A broken pipe extractor comprising:
a hollow pipe body;
a first blocking block located in the pipe body for fixing one end of a pipe joint received in the pipe body, the first blocking block defining a through hole;
a second blocking block movably fixed to one end of the pipe body for fixing another end of the pipe joint; and
a hook needle assembly configured to be inserted through the through hole of the first blocking block and extend to a broken pipe in the pipe joint to hook and remove the broken pipe from the pipe joint.

12. The broken pipe extractor of claim 11, wherein:
the hook needle assembly comprises a needle head and a needle rod coupled to the needle head;
the needle rod is configured to be inserted through the first blocking block; and
the needle head is configured to protrude from the first blocking block and hook the broken pipe.

13. The broken pipe extractor of claim 12, wherein:
the needle head is elastic;
when the needle head protrudes from the first blocking block, an extension direction of the needle head and a length direction of the pipe body form an included angle $\theta$; and $0° < \theta < 90°$.

14. The broken pipe extractor of claim 13, wherein:
the hook needle assembly further comprises a needle sleeve; and
the needle sleeve is sleeved on the needle rod and the needle head.

15. The broken pipe extractor of claim 14, further comprising a third blocking block, wherein:
the needle sleeve comprises a protrusion located at one end of the needle sleeve;
the first blocking block is located between the third blocking block and the second blocking block;
the needle sleeve is inserted into the third blocking block and extends to the first blocking block;
an outer diameter of the protrusion is larger than an inner diameter of the third blocking block; and
the third blocking block is configured to limit a position of the needle sleeve.

16. The broken pipe extractor of claim 15, wherein:
an outer wall of the second blocking block and an inner wall of the pipe body are provided with matching threads.

17. The broken pipe extractor of claim 16, wherein:
the pipe body defines a first opening located between the first blocking block and the second blocking block.

18. The broken pipe extractor of claim 17, wherein:
the pipe body further comprises at least one scale groove; and
the first blocking block is located between the at least one scale groove and the first opening.

19. The broken pipe extractor of claim 18, wherein:
the pipe body further defines a second opening; and
the second opening is located between the first blocking block and the at least one scale groove.

20. The broken pipe extractor of claim 19, further comprising a pulling member, wherein:
the pulling member is coupled to one end of the hook needle assembly.

* * * * *